United States Patent
Wang et al.

(10) Patent No.: US 10,633,537 B2
(45) Date of Patent: Apr. 28, 2020

(54) THERMOPLASTIC COMPOSITIONS HAVING GOOD DIELECTRIC AND DUCTILITY PROPERTIES

(71) Applicant: SABIC GLOBAL TECHNOLOGIES B.V., Bergen op Zoom (NL)

(72) Inventors: Jian Wang, Shanghai (CN); Wei Shan, Shanghai (CN); Xing Liu, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/458,579

(22) Filed: Jul. 1, 2019

(65) Prior Publication Data
US 2020/0010674 A1  Jan. 9, 2020

(30) Foreign Application Priority Data
Jul. 6, 2018 (EP) .................................. 18182152

(51) Int. Cl.
*C08L 71/12* (2006.01)
(52) U.S. Cl.
CPC .......... *C08L 71/12* (2013.01); *C08L 2203/20* (2013.01); *C08L 2205/035* (2013.01)
(58) Field of Classification Search
CPC . C08L 71/12; C08L 2203/20; C08L 2206/035
USPC ....................................................... 524/413
See application file for complete search history.

(56) References Cited

U.S. PATENT DOCUMENTS

| 4,483,958 | A | * | 11/1984 | Kosaka | .................... C08L 25/06 524/409 |
| 4,806,297 | A |   | 2/1989 | Brown et al. | |
| 2004/0059042 | A1 | * | 3/2004 | Hartle | ..................... C08L 25/06 524/500 |
| 2004/0082719 | A1 | * | 4/2004 | Adedeji | ................. B29B 7/7495 525/89 |
| 2009/0215927 | A1 | * | 8/2009 | Mohite | ................. C08F 283/12 523/201 |
| 2017/0260365 | A1 |   | 9/2017 | Liu et al. | |
| 2017/0260367 | A1 |   | 9/2017 | Liu et al. | |
| 2018/0066133 | A1 |   | 3/2018 | Chen et al. | |

FOREIGN PATENT DOCUMENTS

| CN | 103059550 B | 2/2010 | |
| CN | 103102673 A | 5/2013 | |
| CN | 103421298 A | 12/2013 | |
| DE | 4229622 A1 * | 3/1994 | .............. C08L 71/00 |
| JP | 2015-131866 A | 7/2015 | |
| WO | 2017/029564 A1 | 2/2017 | |

OTHER PUBLICATIONS

European Patent Application No. 18182152.1; Extended Search Report; dated Dec. 19, 2018; 7 pages.

* cited by examiner

*Primary Examiner* — Michael Bernshteyn
(74) *Attorney, Agent, or Firm* — BakerHostetler

(57) ABSTRACT

A thermoplastic composition includes from 29.9 wt % to 84.9 wt % of a base resin including poly(p-phenylene oxide) (PPO), polystyrene (PS) and an impact modifier; from 15 wt % to 70 wt % of a dielectric filler; and from 0.1 wt % to 10 wt % of an impact promoter including a polycarbonate-siloxane copolymer, a polyolefin-siloxane copolymer, or a combination thereof. The thermoplastic composition has a dielectric constant (Dk) of from 3.0-8.0 between 1 and 5 gigahertz (GHz) and a dissipation factor (Df) of less than 0.003 between 1 and 5 GHz. Articles including the thermoplastic composition, and in particular telecommunications devices, are also described.

15 Claims, No Drawings

THERMOPLASTIC COMPOSITIONS HAVING GOOD DIELECTRIC AND DUCTILITY PROPERTIES

RELATED APPLICATION

This application claims priority to European Application No. 18182152 filed Jul. 6, 2018, the disclosure of which is incorporated herein by this reference in its entirety.

FIELD OF THE DISCLOSURE

The present disclosure relates to thermoplastic compositions having good dielectric properties, and in particular to thermoplastic compositions including poly(p-phenylene oxide, polystyrene and an impact modifier.

BACKGROUND OF THE DISCLOSURE

Thermoplastics having high dielectric constant (Dk) and low dissipation factor (Df) could find wide applications in the wireless communication industry, for example in the phase shift in a base station antenna system. To make thermoplastic polymers having high Dk performance, a large volume fraction of dielectric filler such as ceramic fillers should be added into the composition. Normally, these types of inorganic fillers could dramatically decrease the mechanical and processing performance of the plastics— and in particular their ductility. International application WO2017/029564 relates to thermoplastic compositions having high Dk and low Df properties and good mechanical performance. However, it could be quite challenging to further improve the impact performance of the compositions described therein when the composition has a relatively high Dk (normally Dk>3.8).

These and other shortcomings are addressed by aspects of the disclosure.

SUMMARY

Aspects of the disclosure relate to thermoplastic compositions including: from 29.9 wt % to 84.9 wt % of a base resin including poly(p-phenylene oxide) (PPO), polystyrene (PS) and an impact modifier; from 15 wt % to 70 wt % of a dielectric filler; and from 0.1 wt % to 10 wt % of an impact promoter including a polycarbonate-siloxane copolymer, a polyolefin-siloxane copolymer, or a combination thereof. The thermoplastic composition has a dielectric constant (Dk) of from 3.0-8.0 between 1 and 5 gigahertz (GHz) and a dissipation factor (Df) of less than 0.003 between 1 and 5 GHz, the combined weight percent value of all components does not exceed 100 wt %, and all weight percent values are based on the total weight of the thermoplastic composition.

DETAILED DESCRIPTION

The present disclosure relates to thermoplastic compositions with high dielectric constant (Dk), low dissipation factor (Df), and improved ductility for electronics-related applications.

The present disclosure can be understood more readily by reference to the following detailed description of the disclosure and the Examples included therein. In various aspects, the present disclosure pertains to thermoplastic compositions including: from 29.9 wt % to 84.9 wt % of a base resin including poly(p-phenylene oxide) (PPO), polystyrene (PS) and an impact modifier; from 15 wt % to 70 wt % of a dielectric filler; and from 0.1 wt % to 10 wt % of an impact promoter including a polycarbonate-siloxane copolymer, a polyolefin-siloxane copolymer, or a combination thereof. The thermoplastic composition has a dielectric constant (Dk) of from 3.0-8.0 between 1 and 5 gigahertz (GHz) and a dissipation factor (Df) of less than 0.003 between 1 and 5 GHz.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a dielectric filler" includes mixtures of two or more dielectric fillers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "Mn" can be used interchangeably, and refer to the statistical average molecular weight of all the polymer chains in the sample and is defined by the formula:

$$M_n = \frac{\sum N_i M_i}{\sum N_i},$$

where Mi is the molecular weight of a chain and Ni is the number of chains of that molecular weight. Mn can be determined for polymers, e.g., polycarbonate polymers, by methods well known to a person having ordinary skill in the art using molecular weight standards, e.g. polycarbonate standards or polystyrene standards, preferably certified or traceable molecular weight standards.

The terms "BisA," "BPA," or "bisphenol A," which can be used interchangeably, as used herein refers to a compound having a structure represented by the formula:

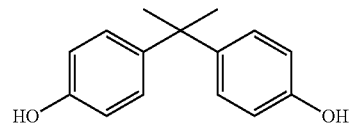 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to thermoplastic compositions including: from 29.9 wt % to 84.9 wt % of a base resin including poly(p-phenylene oxide) (PPO), polystyrene (PS) and an impact modifier; from 15 wt % to 70 wt % of a dielectric filler; and from 0.1 wt % to 10 wt % of an impact promoter including a polycarbonate-siloxane copolymer, a polyolefin-siloxane copolymer, or a combination thereof. The thermoplastic composition has a dielectric constant (Dk) of from 3.0-8.0 between 1 and 5 gigahertz (GHz) and a dissipation factor (Df) of less than 0.003 between 1 and 5 GHz, the combined weight percent value of all components does not exceed 100 wt %, and all weight percent values are based on the total weight of the thermoplastic composition.

In certain aspects the base resin includes from 20 wt % to 85 wt % PPO, from 10 wt % to 50 wt % PS and from 5 wt % to 30 wt % impact modifier.

Any suitable PPO or PS polymer can be used. In particular aspects the PS includes general purpose PS, high impact PS or a combination thereof.

The impact modifier is included to enhance the mechanical properties of the thermoplastic composition. Any suitable impact modifier or combination thereof could be used. Impact modifiers may be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block graft and core-shell copolymers.

A specific type of impact modifier may be an elastomer-modified graft copolymer including (i) an elastomeric (i.e., rubbery) polymer substrate having a Tg less than about 10° C., less than about 0° C. less than about −10° C. or between about −4) ° C. to −80° C., and (ii) a rigid polymer grafted to the elastomeric polymer substrate. Materials suitable for use as the elastomeric phase include, for example, conjugated diene rubbers, for example polybutadiene and polyisoprene, copolymers of a conjugated diene with less than about 50 wt % of a copolymerizable monomer, for example a monovinylic compound such as styrene, acrylonitrile, n-butyl acrylate, or ethyl acrylate, olefin rubbers such as ethylene propylene copolymers (EPR) or ethylene-propylene-diene monomer rubbers (EPDM), ethylene-vinyl acetate rubbers, silicone rubbers, elastomeric Ci-Cs alkyl(meth)acrylates, elastomeric copolymers of Ci-Cs, alkyl(meth)acrylates with butadiene and/or styrene, or combinations including at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the Ci-C6 esters of acrylic acid and methacrylic acid, specifically methyl methacrylate. Other exemplary impact modifiers include styrene-butadiene-styrene (SBS), styrene-butadiene rubber (SBR), styrene-ethylene-butadiene-styrene (SEBS), syndiotactic polystyrene (SPS), styrene ethylene propylene styrene (SEPS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

In certain aspects the impact modifier includes styrene-ethylene/butylene-styrene (SEBS), syndiotactic polystyrene (SPS), styrene-ethylene-propylene-styrene (SEPS), or a combination thereof. In a particular aspect the impact modifier includes styrene-ethylene-butadiene-styrene (SEBS).

Any suitable dielectric filler may be used m the thermoplastic composition. In some aspects the dielectric filler includes metal oxides of alkali metals, alkaline earth metals, transition metals, metalloids or poor metals, calcium oxide, silicon dioxide, cerium oxide, magnesium oxide, titanium oxide, zinc oxide, copper oxide, cerium oxide, niobium oxide, oxide, yttrium oxide, zirconium oxide, aluminum oxide, $CaTiO$, $MgZrSrTiO_6$, $MgTiO_3$, $MgAl_2O_4$, $BaZrO_3$, $BaSnO_3$, $BaNb_2O_6$, $BaTa_2O_6$, $WO_3$, $MnO_2$, $SrZrO_3$, $SnTiO_4$, $ZrTiO_4$, $CaZrO_3$, $CaSnO_3$, $CaWO_4$, $MgTa_2O_6$, $MgZrO_3$, $La_2O_3$, $CaZrO_3$, $MgSnO_3$, $MgNb_2O_6$, $SrNb_2O_6$, $MgTa_2O_6$, $Ta_2O_3$, $Na_2SiO_3$, $LiAlSiO_4$, $Li_4SiO_4$, $BaTSi_3O_9$, $Al_2Si_2O_7$, $ZrSiO_4$, $KAlSi_3O_8$, $NaAlSi_3O_8$, $CaAl_2Si_2O_8$, $CaMgSi_2O_6$, $Zn_2SiO_4$, $LaB_6$, $CeB_6$, $SrB_6$, $CaB_6$, $TiB_2$, $ZrB_2$, $VB_2$, $TaB_2$, $CrB$, $CrB_2$, $MOB_2$, $Mo_2B_5$, $MoB$, $W_2B_5$, silicon carbide, tungsten carbide, tantalum carbide, iron carbide, titanium carbide, silicon nitride, boron nitride, titanium nitride aluminum nitride, molybdenum nitride, $BaTiO_3$, $SrTiO_3$ barium strontium titanate, strontium-doped lanthanum manganate, $LaAlO_3$, $CaCu_3Ti_4Oi_2$, $CdCu_3Ti_4Oi_2$, $Ca_{1-x}La_xMnO_3$, (Li, Ti) doped NiO, lanthanum strontium copper oxides (LSCO), $YBa_2Cu_3O_7$, lead zirconate titanate, lanthanum-modified lead zirconate titanate, or a combination comprising at least one of the foregoing materials.

In a particular aspects the dielectric filler includes a ceramic filler. In certain aspects the ceramic filler includes $TiO_2$, $BaTiO_3$, or a combination thereof.

The thermoplastic composition may in some aspects include 0.5 wt % to 5 wt % of the impact promoter. The impact promoter may have a high siloxane content. In some aspects the impact promoter includes from 40 wt % to 80 wt % siloxane units. Thermoplastic compositions including a high siloxane content impact promoter (e.g., polycarbonate-siloxane copolymer and a polyolefin-siloxane copolymer) may provide compositions having substantially improved impact properties as compared to thermoplastic compositions that have a lower siloxane content component (e.g., 20 wt % siloxane units), even if the overall siloxane content of the composition is the same.

In some aspects the thermoplastic composition has an improved ductility as compared to that of a substantially identical reference composition that does not include the impact promoter. As used herein, a "substantially identical reference composition," is a reference composition that includes the same components, and same amounts of each component, as the disclosed thermoplastic composition, except that the reference composition does not include the recited component (i.e., the impact promoter). Ductility may be determined in accordance with ASTM D256 or ISO 180.

In certain aspects the thermoplastic composition has a notched Izod impact strength at 23 degrees Celsius (° C.) that is from 10% to 400% greater than that of a substantially identical reference composition that does not include the impact promoter. In particular aspects the thermoplastic composition has a notched Izod impact strength at 23° C. that is from 20% to 250% greater than that of a substantially identical reference composition that does not include the impact promoter. In yet further aspects the thermoplastic composition has a notched Izod impact strength at 23° C. that is from 50% to 250% greater than that of a substantially identical reference composition that does not include the impact promoter. In each of these aspects notched Izod impact strength is determined in accordance with ASTM D256 or ISO 180.

In some aspects the thermoplastic composition includes one or more additional additives. Any conventional additive materials can be added, including but not limited to an antioxidant, a colorant, a de-molding agent, a dye, a flow promoter, a flow modifier, a light stabilizer, a lubricant, a mold release agent, a pigment, a quenching agent, a thermal stabilizer, a UV absorbent, a UV reflectant, a UV stabilizer, an epoxy chain extender, a flame retardant, or a combination thereof.

The thermoplastic composition may be made according to any conventional processes, including but not limited to extrusion, injection molding, lamination, co-extrusion, thermo-forming, and hot pressing processes.

Articles Including the Thermoplastic Composition

Aspects of the disclosure further relate to articles including the thermoplastic composition. In some aspects the article is a telecommunications device. In particular aspects the article is an antenna.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising:
from 29.9 wt % to 84.9 wt % of a base resin comprising poly(p-phenylene oxide) (PPO), polystyrene (PS) and an impact modifier;
from 15 wt % to 70 wt % of a dielectric filler; and
from 0.1 wt % to 10 wt % of an impact promoter comprising a polycarbonate-siloxane copolymer, a polyolefin-siloxane copolymer, or a combination thereof,
wherein
the thermoplastic composition has a dielectric constant (Dk) of from 3.0-8.0 between 1 and 5 gigahertz (GHz) and a dissipation factor (Df) of less than 0.003 between 1 and 5 GHz,
the combined weight percent value of all components does not exceed 100 wt %, and
all weight percent values are based on the total weight of the thermoplastic composition.

Aspect 2. The thermoplastic composition according to Aspect 1, wherein the base resin comprises from 20 wt % to 85 wt % PPO, from 10 wt % to 50 wt % PS and from 5 wt % to 30 wt % impact modifier.

Aspect 3. The thermoplastic composition according to Aspect 1 or 2, wherein the PS comprises general purpose PS, high impact PS or a combination thereof.

Aspect 4. The thermoplastic composition according to any of Aspects 1 to 3, wherein the impact modifier comprises styrene-ethylene/butylene-styrene (SEBS), syndiotactic polystyrene (SPS), styrene-ethylene-propylene-styrene (SEPS), or a combination thereof.

Aspect 5. The thermoplastic composition according to any of Aspects 1 to 4, wherein the dielectric filler comprises a ceramic filler.

Aspect 6. The thermoplastic composition according to Aspect 5, wherein the ceramic filler comprises $TiO_2$, $BaTiO_3$, or a combination thereof.

Aspect 7. The thermoplastic composition according to any of Aspects 1 to 6, wherein the thermoplastic composition comprises from 0.5 wt % to 5 wt % of the impact promoter.

Aspect 8. The thermoplastic composition according to any of Aspects 1 to 7, wherein the impact promoter comprises from 40 wt % to 80 wt % siloxane units.

Aspect 9. The thermoplastic composition according to any of Aspects 1 to 8, wherein the thermoplastic composition has an improved ductility as compared to that of a substantially identical reference composition that does not include the impact promoter, and wherein ductility is determined in accordance with ASTM D256 or ISO 180.

Aspect 10. The thermoplastic composition according to any of Aspects 1 to 9, wherein the thermoplastic composition has a notched Izod impact strength at 23 degrees Celsius (° C.) that is from 10% to 400% greater than that of a substantially identical reference composition that does not include the impact promoter, and wherein notched Izod impact strength is determined in accordance with ASTM D256 or ISO 180.

Aspect 11. The thermoplastic composition according to any of Aspects 1 to 10, wherein the thermoplastic composition has a notched Izod impact strength at 23° C. that is from 20% to 250% greater than that of a substantially identical reference composition that does not include the impact promoter, and wherein notched Izod impact strength is determined in accordance with ASTM D256 or ISO 180.

Aspect 12. The thermoplastic composition according to any of Aspects 1 to 11, wherein the thermoplastic composition has a notched Izod impact strength at 23° C. that is from 50% to 250% greater than that of a substantially identical reference composition that does not include the impact promoter, and wherein notched Izod impact strength is determined in accordance with ASTM D256 or ISO 180.

Aspect 13. The thermoplastic composition according to any of Aspects 1 to 12, wherein the thermoplastic composition comprises one or more additional additives.

Aspect 14. The thermoplastic composition according to Aspect 13, wherein the one or more additional additives comprises an antioxidant, a colorant, a de-molding agent, a dye, a flow promoter, a flow modifier, a light stabilizer, a lubricant, a mold release agent, a pigment, a quenching agent, a thermal stabilizer, a UV absorbent, a UV reflectant, a UV stabilizer, an epoxy chain extender, a flame retardant, or a combination thereof.

Aspect 15. An article comprising the thermoplastic composition according to any of Aspects 1 to 14.

Aspect 16. The article according to Aspect 15, wherein the article is a telecommunications device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Table 1 lists the typical extrusion profile of the developed compositions, and Table 2 lists the typical molding profile of the developed compositions:

TABLE 1

| Parameters | Unit | PPO based composition |
|---|---|---|
| Compounder Type | NONE | TEM-37BS |
| Barrel Size | mm | 1500 |
| Die | mm | 4 |
| Feed (Zone 0) Temp | NONE | 50 |

TABLE 1-continued

| Parameters | Unit | PPO based composition |
|---|---|---|
| Zone 1 Temp | ° C. | 90 |
| Zone 2 Temp | ° C. | 150 |
| Zone 3 Temp | ° C. | 270 |
| Zone 4 Temp | ° C. | 270 |
| Zone 5 Temp | ° C. | 280 |
| Zone 6 Temp | ° C. | 280 |
| Zone 7 Temp | ° C. | 280 |
| Zone 8 Temp | ° C. | 290 |
| Zone 9 Temp | ° C. | 290 |
| Zone 10 Temp | ° C. | 290 |
| Zone 11 Temp | ° C. | 290 |
| Die Temp | ° C. | 290 |
| Screw speed | rpm | 300 |
| Throughput | kg/hr | 30 |
| Torque | NONE | 35-45 |
| Vacuum 1 | MPa | −0.08 |
| Side Feeder 1 speed | rpm | 250 |
| Melt temperature | NONE | 290-295 |

TABLE 2

| Parameters | Unit | PPO based composition |
|---|---|---|
| Cnd: Pre-drying time | Hour | 3 |
| Cnd: Pre-drying temp | ° C. | 105 |
| Molding Machine | NONE | FANUC, ES3000 |
| Mold Type (insert) | NONE | ASTM tensile, ASTM flexural, ASTM Izod, ISO Izod, 150 mm × 150 mm × 2.0 mm plaque |
| Hopper temp | ° C. | 50 |
| Zone 1 temp | ° C. | 280-290 |
| Zone 2 temp | ° C. | 290-300 |
| Zone 3 temp | ° C. | 300-310 |
| Nozzle temp | ° C. | 290-300 |
| Mold temp | ° C. | 90-120 |
| Screw speed | rpm | 100 |
| Back pressure | kgf/cm$^2$ | 90 |
| Cooling time | s | 15-20 |
| Injection speed | mm/s | 50-150 |
| Holding pressure | kgf/cm$^2$ | 600-1100 |
| Max. Injection pressure | kgf/cm$^2$ | 1000-1500 |

Thermoplastic compositions with high Dk, low Df properties and improved ductility were developed using the basic building blocks of PPO, GPPS, SEBS, TiO$_2$, and a PC copolymer (C9030P-E, available from SABIC) which contains 60 wt % polysiloxane blocks. The formulations were listed in Table 3. From E1.1 to E1.3, the loading of the PC copolymer increased from 1% to 3%. C1.1 and C1.2 were the control samples, which either had no PC copolymer (C1.1) or included 3% PC copolymer having 20% polysiloxane content (C1.2).

TABLE 3

| Item Description | Unit | C1.1 | C1.2 | E1.1 | E1.2 | E1.3 |
|---|---|---|---|---|---|---|
| PPO, .46IV | % | 46.7 | 43.7 | 45.7 | 44.7 | 43.7 |
| KRATON ™ SEBS G1652, Melt Index higher than 3 g/10 min at 230° C./5 kg | % | 8 | 8 | 8 | 8 | 8 |
| Coated TiO$_2$ K2233 | % | 35 | 35 | 35 | 35 | 35 |
| 60% PC-siloxane copolymer (C9030P-E) | % | | | 1 | 2 | 3 |
| 20% PC-siloxane copolymer (C9030P) | % | | 3 | | | |
| GPPS | % | 9 | 9 | 9 | 9 | 9 |
| LLDPE | % | 1 | 1 | 1 | 1 | 1 |
| MAG OXIDE | % | 0.1 | 0.1 | 0.1 | 0.1 | 0.1 |
| Zinc Sulfide | % | 0.1 | 0.1 | 0.1 | 0.1 | 0.1 |
| Phosphite Stabilizer, Irgafos 168 | % | 0.1 | 0.1 | 0.1 | 0.1 | 0.1 |

Physical, mechanical, thermal and dielectric performance of the compositions are listed in Table 4. When no PC copolymer was used in the formulation, Notched Izod impact strength of the sample at 23° C. was only 175 Joule per meter (J/m) (17.9 kilojoule per square meter (kJ/m$^2$)) with 0% ductility (C1.1). However, when 1% of the high siloxane content PC copolymer was added, impact strength of the sample substantially increased to 267 J/m (32 kJ/m$^2$) and 100% ductility at 23° C. (E1.1). In addition, the thermal and mechanical performance of the samples were generally maintained or only slightly decreased (E1.1 vs. C1.1). For dielectric performance, the addition of the PC copolymer provided in increase in Dk of the sample could be increased (E1.1). Although the Df of the sample was also increased, but the value was still kept at a low level (E1.1).

The sample in C1.2 contained the same polysiloxane loading as that in E1.1. Thus, performance of these two samples were compared with each other. Although having equal polysiloxane content, the impact performance of E1.1 was still much better than that of C1.2 (267 J/m vs. 155 J/m), indicating the unexpected result of the use of a high siloxane content PC copolymer. For the dielectric performance, the sample in E1.1 showed a little lower Df than that in C1.2; the Dk of the two samples were comparable.

The loading of the C9030P-E PC copolymer in the formulations was further increased in E1.2 and E1.3. At 2% C9030P-E in E1.2, the sample had very good ductility with the notched Izod impact strength (NII) at 23° C. as high as 530 J/m (42.3 kJ/m$^2$). At the same time, thermal (HDT) and mechanical (tensile, flexural) performance of the sample was decreased, and Df of the sample was slightly increased with the value of 0.0021 at 1.9 GHz. For example E1.3, with a 3% loading of C9030P-E, NII of the sample at 23° C. could be further improved to 613 J/m (47.6 kJ/m$^2$), with a little lower thermal and mechanical performance and higher Df value.

TABLE 4

| Typical Property | Test Method | Test Description | Unit | C1.1 | C1.2 | E1.1 | E1.2 | E1.3 |
|---|---|---|---|---|---|---|---|---|
| Density | Specific Gravity | ASTM D792 | g/cm$^3$ | 1.394 | 1.410 | 1.409 | 1.398 | 1.395 |
| MVR | 300° C./5 kg | ASTM D1238 | cm$^3$/10 min | 7.7 | 10.2 | 7.6 | 9.8 | 12.4 |
| MVR | 300° C./10 kg | ASTM D1238 | cm$^3$/10 min | 22.4 | 31.1 | 24.1 | 30.5 | 39.1 |
| Notched IZOD | 23° C., 5 lbf/ft | ASTM D256 | J/m | 175 | 155 | 267 | 530 | 613 |
| Ductility | 23° C., 5 lbf/ft | ASTM D256 | % | 0 | 0 | 100 | 100 | 100 |
| Notched IZOD | −20° C., 5 lbf/ft | ASTM D256 | J/m | 129 | 106 | 132 | 159 | 165 |
| Notched IZOD | 23° C., 5 lbf/ft | ISO 180 | kJ/m$^2$ | 17.9 | 14.3 | 32.0 | 42.3 | 47.6 |
| Ductility | 23° C., 5 lbf/ft | ISO 180 | % | 0 | 100 | 100 | 100 | 100 |
| Notched IZOD | −20° C., 5 lbf/ft | ISO 180 | kJ/m$^2$ | 11.5 | 10.0 | 11.9 | 13.2 | 17.1 |
| HDT | 0.45 MPa/3.2 mm | ASTM D648 | °C. | 146 | 143 | 145 | 140 | 137 |
| HDT | 1.82 MPa/3.2 mm | ASTM D648 | °C. | 168 | 164 | 168 | 165 | 163 |
| Flexural Modulus | 3.2 mm, 1.27 mm/min | ASTM D790 | MPa | 2110 | 2150 | 2050 | 1840 | 1730 |
| Flexural Strength | @break, 3.2 mm, 1.27 mm/min | ASTM D790 | MPa | 73 | 74 | 71 | 66 | 63 |
| Tensile Modulus | 50 mm/min | ASTM D638 | MPa | 2230 | 2290 | 2200 | 1990 | 1870 |
| Tensile Strength | @yield, 50 mm/min | ASTM D638 | MPa | 48 | 47 | 45 | 40 | 38 |
| Tensile Elongation | @break, 50 mm/min | ASTM D638 | % | 15.0 | 11.8 | 14.9 | 9.8 | 8.5 |
| Dk | 1.9 GHz | SABIC Method | — | 3.71 | 3.79 | 3.80 | 3.82 | 3.82 |
| Df | 1.9 GHz | SABIC Method | — | 0.0013 | 0.0020 | 0.0017 | 0.0021 | 0.0024 |
| Dk | 5 GHz | SABIC Method | — | 3.75 | 3.84 | 3.82 | 3.84 | 3.84 |
| Df | 5 GHz | SABIC Method | — | 0.0017 | 0.0024 | 0.0021 | 0.0025 | 0.0029 |

An example composition and comparative composition having a 45% TiO$_2$ content was made (E2.1 and C2.1, respectively). The compositions and properties are provided in Tables 5 and 6, respectively:

TABLE 5

| Item Description | Unit | C2.1 | E2.1 |
|---|---|---|---|
| PPO, .46IV | % | 33.7 | 31.7 |
| KRATON™ SEBS G1652, Melt Index higher than 3 g/10 min at 230° C./5 kg | % | 8 | 8 |
| Coated TiO$_2$ K2233 | % | 45 | 45 |
| 60% PC-siloxane copolymer | % |  | 2 |
| GPPS | % | 12 | 12 |
| LLDPE | % | 1 | 1 |
| MAG OXIDE | % | 0.1 | 0.1 |
| Zinc Sulfide | % | 0.1 | 0.1 |
| Phosphite Stabilizer, Irgafos 168 | % | 0.1 | 0.1 |

With a high dielectric filler (TiO$_2$) loading of 45%, the sample with no PC copolymer had an NII at 23° C. of only 114 J/m (10 kJ/m$^2$) and a Dk and Df of 4.42 and 0.0013 at 1.9 GHz, respectively (see C2.1). With 2% C9030P-E added, the NII of the sample could be improved to be 145 J/m (15.2 kJ/m$^2$), nearly 30% higher even when the dielectric filler loading was high (see E2.1). The Dk of the sample was slightly higher with the use of the PC copolymer (4.68 at 1.9 GHz). Df increased as well, but could still be kept at a relatively low level (0.0021 at 1.9 GHz, see E2.1).

Additional compositions including an organosiloxane-polyolefin-copolymer (Tegomer® PP-Si 401, from Evonik) were also made. The formulations are listed in Table 7. From E3.1 to E3.3, loading of the copolymer was increased from 1% to 2%. The control (C3.1) had no PP-Si 401 copolymer.

TABLE 6

| Typical Property | Test Method | Test Description | Unit | C2.1 | E2.1 |
|---|---|---|---|---|---|
| Density | Specific Gravity | ASTM D792 | g/cm$^3$ | 1.545 | 1.559 |
| MVR | 300° C./5 kg | ASTM D1238 | cm$^3$/10 min | 8.1 | 11.1 |
| MVR | 300° C./10 kg | ASTM D1238 | cm$^3$/10 min | 25.0 | 36.3 |
| Notched IZOD | 23° C., 5 lbf/ft | ASTM D256 | J/m | 114 | 145 |
| Notched IZOD | −20° C., 5 lbf/ft | ASTM D256 | J/m | 91 | 109 |
| Notched IZOD | 23° C., 5 lbf/ft | ISO 180 | kJ/m$^2$ | 10.0 | 15.2 |
| Notched IZOD | −20° C., 5 lbf/ft | ISO 180 | kJ/m$^2$ | 8.8 | 10.1 |
| HDT | 0.45 MPa/3.2 mm | ASTM D648 | °C. | 137 | 126 |
| HDT | 1.82 MPa/3.2 mm | ASTM D648 | °C. | 157 | 150 |
| Flexural Modulus | 3.2 mm, 1.27 mm/min | ASTM D790 | MPa | 2360 | 1890 |
| Flexural Strength | @break, 3.2 mm, 1.27 mm/min | ASTM D790 | MPa | 72 | 63 |
| Tensile Modulus | 50 mm/min | ASTM D638 | MPa | 2615 | 2125 |
| Tensile Strength | @yield, 50 mm/min | ASTM D638 | MPa | 44 | 37 |
| Tensile Elongation | @break, 50 mm/min | ASTM D638 | % | 7.9 | 8.2 |
| Dk | 1.9 GHz | SABIC Method | — | 4.42 | 4.68 |
| Df | 1.9 GHz | SABIC Method | — | 0.0013 | 0.0021 |
| Dk | 5 GHz | SABIC Method | — | 4.42 | 4.67 |
| Df | 5 GHz | SABIC Method | — | 0.0017 | 0.0026 |

TABLE 7

| Item Description | Unit | C3.1 | E3.1 | E3.2 | E3.3 |
|---|---|---|---|---|---|
| PPO, .46IV | % | 45.7 | 44.7 | 44.2 | 43.7 |
| KRATON ™ SEBS G1652, Melt Index higher than 3 g/10 min at 230° C./5 kg | % | 8 | 8 | 8 | 8 |
| Bright white TiO₂ pigment | % | 37 | 37 | 37 | 37 |
| PP-Si 401 | % |  | 1 | 1.5 | 2 |
| GPPS | % | 8 | 8 | 8 | 8 |
| LLDPE | % | 1 | 1 | 1 | 1 |
| MAG OXIDE | % | 0.1 | 0.1 | 0.1 | 0.1 |
| Zinc Sulfide | % | 0.1 | 0.1 | 0.1 | 0.1 |
| Phosphite Stabilizer, Irgafos 168 | % | 0.1 | 0.1 | 0.1 | 0.1 |

The properties of these compositions are listed in Table 8. With the addition of organosiloxane-polyolefin-copolymer, impact performance of the sample could be increased from 184 J/m (18.4 kJ/m$^2$, C3.1) to 229 J/m (20.8 kJ/m$^2$, 1% loading, E3.1) and to 292 J/m (23.2 kJ/m$^2$, 1.5% loading, E3.2). In addition, thermal and mechanical performance of the sample decreased only slightly. Addition of the organosiloxane-polyolefin-copolymer increased the Df, but the increase could be minimized if the organosiloxane-polyolefin-copolymer loading was not high (e.g., <1.5%).

TABLE 8

Properties of the high Dk, low Df compositions with improved ductility.

| Typical Property | Test Method | Test Description | Unit | C3.1 | E3.1 | E3.2 | E3.3 |
|---|---|---|---|---|---|---|---|
| Density | Specific Gravity | ASTM D792 | g/cm$^3$ | 1.437 | 1.441 | 1.441 | 1.439 |
| MVR | 300° C./5 kg | ASTM D1238 | cm$^3$/10 min | 7.1 | 7.6 | 8.4 | 8.8 |
| MVR | 300° C./10 kg | ASTM D1238 | cm$^3$/10 min | 20 | 23 | 25 | 28 |
| Notched IZOD | 23° C., 5 lbf/ft | ASTM D256 | J/m | 184 | 229 | 292 | 265 |
| Ductility | 23° C., 5 lbf/ft | ASTM D256 | % | 100 | 100 | 100 | 100 |
| Notched IZOD | −20° C., 5 lbf/ft | ASTM D256 | J/m | 141 | 158 | 156 | 166 |
| Notched IZOD | 23° C., 5 lbf/ft | ISO 180 | kJ/m$^2$ | 18.4 | 20.8 | 23.2 | 31.7 |
| Ductility | 23° C., 5 lbf/ft | ISO 180 | % | 100 | 100 | 100 | 100 |
| Notched IZOD | −20° C., 5 lbf/ft | ISO 180 | kJ/m$^2$ | 13.1 | 14.6 | 14.7 | 15.5 |
| HDT | 0.45 MPa/3.2 mm | ASTM D648 | ° C. | 153 | 150 | 145 | 143 |
| HDT | 1.82 MPa/3.2 mm | ASTM D648 | ° C. | 174 | 172 | 169 | 167 |
| Flexural Modulus | 3.2 mm, 1.27 mm/min | ASTM D790 | MPa | 2250 | 2170 | 2080 | 2000 |
| Flexural Strength | @break, 3.2 mm, 1.27 mm/min | ASTM D790 | MPa | 75 | 72 | 71 | 69 |
| Tensile Modulus | 50 mm/min | ASTM D638 | MPa | 2445 | 2436 | 2219 | 2172 |
| Tensile Strength | @break, 50 mm/min | ASTM D638 | MPa | 48 | 44 | 38 | 33 |
| Tensile Elongation | @break, 50 mm/min | ASTM D638 | % | 12.0 | 8.9 | 10.6 | 9.9 |
| Dk | 1.9 GHz | SABIC Method | — | 3.97 | 4.04 | 4.03 | 4.07 |
| Df | 1.9 GHz | SABIC Method | — | 0.0012 | 0.0016 | 0.0021 | 0.0025 |

Conclusion: thermoplastic compositions with high Dk, low Df, and improved ductility were developed using the basic building blocks of PPO, GPPS, SEBS, TiO₂ and a high siloxane content PC copolymer or an organosiloxane-polyolefin-copolymer. The compositions showed good dielectric, mechanical and processing performance. Impact strength could be >600 J/m when Dk of the compositions were as high as 3.8 at 1-5 GHz. The Df of the compositions could be minimized, i.e., Df<0.003 at 1-5 GHz.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A thermoplastic composition comprising:
    from 29.9 wt % to 84.9 wt % of a base resin comprising poly(p-phenylene oxide) (PPO), polystyrene (PS) and an impact modifier;
    from 15 wt % to 70 wt % of a dielectric filler; and
    from 0.1 wt % to 10 wt % of an impact promoter comprising a polycarbonate-siloxane copolymer, a polyolefin-siloxane copolymer, or a combination thereof, wherein
the thermoplastic composition has a dielectric constant (Dk) of from 3.0-8.0 between 1 and 5 gigahertz (GHz) and a dissipation factor (Df) of less than 0.003 between 1 and 5 GHz,
the combined weight percent value of all components does not exceed 100 wt %, and
all weight percent values are based on the total weight of the thermoplastic composition.

2. The thermoplastic composition according to claim 1, wherein the base resin comprises from 20 wt % to 85 wt % PPO, from 10 wt % to 50 wt % PS and from 5 wt % to 30 wt % impact modifier.

3. The thermoplastic composition according to claim 1, wherein the PS comprises general purpose PS, high impact PS or a combination thereof.

4. The thermoplastic composition according to claim 1, wherein the impact modifier comprises styrene-ethylene/butylene-styrene (SEBS), syndiotactic polystyrene (SPS), styrene-ethylene-propylene-styrene (SEPS), or a combination thereof.

5. The thermoplastic composition according to claim 1, wherein the dielectric filler comprises a ceramic filler.

6. The thermoplastic composition according to claim 5, wherein the ceramic filler comprises $TiO_2$, $BaTiO_3$, or a combination thereof.

7. The thermoplastic composition according to claim 1, wherein the thermoplastic composition comprises from 0.5 wt % to 5 wt % of the impact promoter.

8. The thermoplastic composition according to claim 1, wherein the impact promoter comprises from 40 wt % to 80 wt % siloxane units.

9. The thermoplastic composition according to claim 1, wherein the thermoplastic composition has a 100% ductility at 23° C. as determined in accordance with ASTM D256 or ISO 180.

10. The thermoplastic composition according to claim 1, wherein the thermoplastic composition has a notched Izod impact strength at 23 degrees Celsius (° C.) that is from 10% to 400% greater than that of a substantially identical reference composition that does not include the impact promoter, and wherein notched Izod impact strength is determined in accordance with ASTM D256 or ISO 180.

11. The thermoplastic composition according to claim 1, wherein the thermoplastic composition has a notched Izod impact strength at 23° C. that is from 20% to 250% greater than that of a substantially identical reference composition that does not include the impact promoter, and wherein notched Izod impact strength is determined in accordance with ASTM D256 or ISO 180.

12. The thermoplastic composition according to claim 1, wherein the thermoplastic composition has a notched Izod impact strength at 23° C. that is from 50% to 250% greater than that of a substantially identical reference composition that does not include the impact promoter, and wherein notched Izod impact strength is determined in accordance with ASTM D256 or ISO 180.

13. The thermoplastic composition according to claim 1, wherein the thermoplastic composition comprises one or more additional additives.

14. The thermoplastic composition according to claim 13, wherein the one or more additional additives comprises an antioxidant, a colorant, a de-molding agent, a dye, a flow promoter, a flow modifier, a light stabilizer, a lubricant, a mold release agent, a pigment, a quenching agent, a thermal stabilizer, a UV absorbant, a UV reflectant, a UV stabilizer, an epoxy chain extender, a flame retardant, or a combination thereof.

15. An article comprising the thermoplastic composition according to claim 1, wherein the article is a telecommunications device.

* * * * *